Patented Nov. 7, 1944

2,362,013

UNITED STATES PATENT OFFICE 2,362,013

STABLE COLLOIDAL SOLUTIONS CONTAINING LECITHIN AND CHOLESTEROL AND PROCESS OF PREPARING SAME

Carl Ludwig Lautenschläger and Fritz Lindner, Frankfort-on-the-Main, and Adolf Mager, Niedernhausen in Taunus, Germany, assignors to Winthrop Chemical Company, Inc., New York, N. Y., a corporation of New York No Drawing. Application April 23, 1941, Serial No. 389,952. In Germany May 7, 1940

10 Claims. (Cl. 252—311)

The present invention relates to a process of preparing stable colloidal solutions containing lecithin and cholesterol and to the colloidal solutions obtained thereby.

Researches on the usefulness of lipins as remedies have already been made for a long time past. The physiological and pharmacological effect of the lipins depends in a high degree upon their physico-chemical state. Numerous functions of the lipins are only attributable to their colloidal character. In the organism, for instance, in the plasma the lipins are present in the form of an aqueous very disperse sol whereas in the intestine (resorption-form) and in the storage organs (depot-form) they occur as liquid fatty mixtures.

This physiologically active form which may be termed "cell-disperse" (cf. Muenchener medizinsche Wochenschrift, 2,1925, page 2143) is a colloidal system whose effects are based on the antagonism of the hydrophilic lecithin and the hydrophobic cholesterol and which, like other biocolloids, is a very fine colloidal solution of the substances in the aqueous phase.

Processes for preparing such colloidal solutions consisting of several lipin-components and being useful as therapeutics have not been described in the pertinent art. The preparation of colloidal solutions containing a single lipin-component is known and is generally effected in such a manner that the lipin for instance, lecithin, is dissolved in ethanol and the alcoholic solution is filtered and pressed into water through a nozzle fused to the end of a capillary, while vigorously stirring. The whole operation is carried out in a thermostat at 80° C. After cooling, the solvent is removed by dialyzing for 24 hours, (H. G. Bungenberg de Jong and E. T. Westerkamp, Biochemische Zeitschrift, 1931, 234, page 347).

The ample literature dealing with the parenteral therapeutics of lipins repeatedly calls for a biological lipin complex whose contents of individual lipins such as lecithin and cholesterol be adapted to a great extent to the proportion of the blood lipins. By applying the known process of manufacture to a solution containing cholesterin in addition to lecithin there is obtained a very heterodisperse colloidal solution of only small stability to storing.

Now, we have found that stable colloidal solutions containing lecithin and cholesterol may be obtained by mixing each a solution of lecithin and of cholesterol in solvents miscible with water, pressing the mixture obtained at moderately elevated temperature through a fine nozzle in counter-current into pure water and freeing the solution thus obtained from the solvents by distillation under reduced pressure. Suitable solvents for lecithin are, for instance, alcohols of low molecular weight containing at most 4 carbon atoms; as solvents for cholesterol there may be used aliphatic ketones and carboxylic acid esters of low molecular weight containing at most 4 carbon atoms and being miscible with water such as acetone, methyl-ethyl ketone, ethyl formate, methyl acetate and ethyl acetate. For introducing into water the lipins dissolved in the organic solvents, temperatures between about 40° C. and about 55° C. have proved to be especially suitable. It is advantageous to allow the lipin solution to stand for some time, for instance 1–3 days, before distilling off the solvent. In order to avoid the disagreeable foaming during the preparation of the colloidal solution and the distillation a small quantity of octyl alcohol may be added.

Furthermore, we have found that colloidal solutions of especially good stability to storing are obtained by using instead of pure cholesterol a mixture of cholesterol and its oleic and palmitic acid esters.

The colloidal solutions of the lipins freed from the solvents may be brought to the desired volume by further evaporating or filling up with water.

The new colloidal solutions are distinguished by a highly colloidal form, a good stability against heat and electrolytes and a high stability to storing.

For the purposes of the present invention it is to be understood that the expression "lipin" comprises, for instance, phosphatides such as lecithin and sterines such as cholesterol.

The following examples serve to illustrate the invention but they are not intended to limit it thereto:

1. 24 grams of well purified egg-lecithin are dissolved in 1 liter of ethanol and filtered.

8 grams of cholesterol, 7 grams of chclesterol-palmitate and 7 grams of cholesterol-oleate are together dissolved in 1 liter of acetone. Both solutions are combined, heated on the steam-bath to 45° C.–50° C., 10 cc. of octyl alcohol are added in order to prevent the formation of foam and the whole is pressed in counter-current through a nozzle into 6 liters of distilled water of 45° C. After standing for 40–48 hours at room temperature, ethanol and acetone are eliminated by evaporating under reduced pressure to 4 liters.

The finished highly colloidal solution is filtered under sterile conditions through a Seitz-filter and filled into ampoules.

2. 24 grams of well-purified egg-lecithin are dissolved in 1 liter of methanol and filtered.

8 grams of cholesterol and 14 grams of cholesterol-palmitate are together dissolved in 1 liter of acetone.

Both solutions are combined and further treated as indicated in Example 1.

3. 24 grams of well purified egg-lecithin are dissolved in 1 liter of ethanol and filtered.

8 grams of cholesterol, 7 grams of cholesterol-palmitate and 7 grams of cholesterol-oleate are together dissolved in 1 liter of methyl acetate.

Both solutions are combined and further treated as indicated in Example 1.

We claim:

1. The process of preparing stable and highly colloidal solutions of lipins which comprises mixing a solution of lecithin in an alcohol of at most 4 carbon atoms and a solution of at least one member of the group consisting of cholesterol and its esters of oleic acid and palmitic acid in a solvent of the group consisting of ketones and carboxylic acid esters of at most 4 carbon atoms with water by means of a nozzle and in counter-current at a slightly raised temperature and subsequently evaporating the organic solvents under reduced pressure.

2. The process of preparing stable and highly colloidal solutions of lipins which comprises mixing a solution of lecithin in a member of the group consisting of methyl and ethyl alcohol and a solution of at least one member of the group consisting of cholesterol and its esters of oleic acid and palmitic acid in a solvent of the group consisting of ketones and carboxylic acid esters of at most 4 carbon atoms with water by means of a nozzle and in counter-current at a temperature between about 40° C. and about 55° C. and subsequently evaporating the organic solvents under reduced pressure.

3. The process of preparing stable and highly colloidal solutions of lipins which comprises mixing a solution of lecithin in a member of the group consisting of methyl and ethyl alcohol and a solution of at least one member of the group consisting of cholesterol and its esters of oleic acid and palmitic acid in acetone with water by means of a nozzle and in counter-current at a temperature between about 40° C. and about 55° C. and subsequently evaporating the organic solvents under reduced pressure after allowing the solution to stand for 40–48 hours.

4. The process of preparing stable and highly colloidal solutions of lipins which comprises mixing a solution of lecithin in methyl alcohol and a solution of at least one member of the group consisting of cholesterol and its esters of oleic acid and palmitic acid in methyl acetate with water by means of a nozzle and in counter-current at a temperature between about 40° C. and about 55° C. and subsequently evaporating the organic solvents under reduced pressure after allowing the solution to stand for 40–48 hours.

5. The process of preparing stable and highly colloidal solutions of lipins which comprises mixing a solution of lecithin in methyl alcohol and a solution of cholesterol and its palmitic acid ester in acetone in the presence of a small amount of octyl alcohol with water by means of a nozzle and in counter-current at a temperature between about 40° C. and about 55° C. and subsequently evaporating the organic solvents under reduced pressure after allowing the solution to stand for 40–48 hours.

6. The process of preparing stable and highly colloidal solutions of lipins which comprises mixing a solution of lecithin in ethyl alcohol and a solution of cholesterol and its esters of oleic acid and palmitic acid in methyl acetate in the presence of a small amount of octyl alcohol with water by means of a nozzle and in counter-current at a temperature between about 45° C. and about 50° C. and subsequently evaporating the organic solvents under reduced pressure after allowing the solution to stand for 40–48 hours.

7. The process of preparing stable and highly colloidal solutions of lipins which comprises mixing a solution of lecithin in ethyl alcohol and a solution of cholesterol and its esters of oleic acid and palmitic acid in acetone in the presence of a small amount of octyl alcohol with water by means of a nozzle and in countercurrent at a temperature between about 45° C. and about 50° C. and subsequently evaporating the organic solvents under reduced pressure after allowing the solution to stand for 40–48 hours.

8. A stable and highly colloidal aqueous solution consisting of, per liter of solution, about 6 grams of lecithin, about 2 grams of cholesterol and about 3.5 grams of a cholesterol higher fatty acid ester, said cholesterol higher fatty acid ester being selected from the group consisting of cholesterol palmitate, cholesterol oleate, and mixtures thereof.

9. A stable and highly colloidal aqueous solution consisting of the following ingredients in approximately the following proportions:

| | Grams |
|---|---|
| Lecithin | 6.00 |
| Cholesterol | 2.00 |
| Cholesterol palmitate | 1.75 |
| Cholesterol oleate | 1.75 | per liter of solution.

10. A stable and highly colloidal aqueous solution consisting of the following ingredients in approximately the following proportions:

| | Grams |
|---|---|
| Lecithin | 6.0 |
| Cholesterol | 2.0 |
| Cholesterol palmitate | 3.5 | per liter of solution.

CARL LUDWIG LAUTENSCHLÄGER.
FRITZ LINDNER.
ADOLF MAGER.